US012762762B2

(12) United States Patent
Krishnamurthy

(10) Patent No.: US 12,762,762 B2
(45) **Date of Patent: *Oct. 13, 2026**

(54) CUSTOMIZED DIGITAL HUMANS AND PETS FOR METAVERSE

(71) Applicant: SONY INTERACTIVE ENTERTAINMENT INC., Tokyo (JP)

(72) Inventor: Sudha Krishnamurthy, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 18/806,342

(22) Filed: Aug. 15, 2024

(65) Prior Publication Data

US 2025/0086862 A1 Mar. 13, 2025

Related U.S. Application Data

(63) Continuation of application No. 17/935,565, filed on Sep. 26, 2022, now Pat. No. 12,100,081.

(51) Int. Cl.

*G06T 11/00* (2026.01)
*G06T 11/10* (2026.01)
*G06T 11/60* (2006.01)

(52) U.S. Cl.

CPC .............. *G06T 11/60* (2013.01); *G06T 11/10* (2026.01)

(58) Field of Classification Search

None

See application file for complete search history.

(56) References Cited

U.S. PATENT DOCUMENTS 6,929,549 B1 8/2005 Yamada
2008/0215973 A1* 9/2008 Zalewski ................ A63F 13/77 715/764
2009/0096796 A1* 4/2009 Brown .................. G06T 13/205 345/473
2010/0228633 A1 9/2010 Guimaraes et al.
2011/0014985 A1* 1/2011 Park ........................ A63F 13/60 463/43
2013/0079128 A1 3/2013 Thomas et al.
2014/0078144 A1* 3/2014 Berriman ................ A63F 13/61 345/426
2019/0080519 A1* 3/2019 Osman ................. H04N 13/383
2020/0066037 A1* 2/2020 Hare .......................... G06T 7/55

(Continued)

OTHER PUBLICATIONS

Malleson et al., "Rapid One-Shot Acquisition of DynamicVR Avatars", 2017 IEEE Virtual Reality (VR), 2017.

(Continued)

*Primary Examiner* — Zhihan Zhou

(74) *Attorney, Agent, or Firm* — Kilpatrick Townsend & Stockton LLP

(57) ABSTRACT

Deep learning is used to dynamically adapt virtual humans in metaverse applications. The adaptation can be according to user preferences. In addition or alternatively, virtual humans and pets can be adapted for metaverse applications based on demographics of the user. The user's personal demographics may be used to establish the costume, skin color, emotion, voice, and behavior of the virtual humans. Similar considerations may be used to adapt virtual pets to the user's experience of the metaverse.

19 Claims, 4 Drawing Sheets

(56) References Cited

U.S. PATENT DOCUMENTS

2020/0371677 A1 11/2020 Faulkner et al.
2023/0035306 A1* 2/2023 Liu ...................... H04N 19/597

OTHER PUBLICATIONS

Oshita, Masaki, "Motion-Capture-Based Avatar Control Framework in Third-Person View Virtual Environments", Kyushu Institute of Technology, 2006.
Wang et al., "Shared Realities:Avatar Identification and Privacy Concerns in Reconstructed Experiences", Proceedings of the ACM on Human-Computer Interaction, 2021, 1-25.

* cited by examiner

CUSTOMIZED DIGITAL HUMANS AND PETS FOR METAVERSE

FIELD

The present application relates generally to customized digital humans and pets for the "Metaverse".

BACKGROUND

The "Metaverse", essentially a networked system of virtual reality (VR) and augmented reality (AR) worlds, accessed through a browser or headset, lacks the unpredictable diversity of real life.

SUMMARY

Accordingly, a device includes at least one computer storage that is not a transitory signal and that in turn incudes instructions executable by at least one processor to receive at least one image of a person viewing a display and input the image to a machine learning (ML) model. The instructions are executable to receive from the ML model information regarding customization of a virtual being in a metaverse. The instructions are executable to present on the display the virtual being with a customized appearance altered from an original appearance according to the information from the ML model.

The virtual being may be, e.g., a virtual human or a virtual non-human animal including terrestrial animals, birds, and fish.

Without limitation, the information regarding customization can include one or more of information concerning apparel, information concerning skin color, information concerning emotion, information concerning behavior, and speech.

If desired, the speech may be derived by optional instructions executable to receive at least one recording of speech of the person, input the recording to the ML model, responsive to inputting the recording, receive from the ML model information regarding customization of the virtual being, and present on the display the virtual being with a customized voice altered from an original voice according to the information from the ML model.

In example embodiments the display can be considered a user display and the instructions can be executable to send the information regarding customization to at least one display presenting the metaverse other than the user display so that the virtual being appears in customized form on both the user display and the at least one display presenting the metaverse other than the user display.

In another aspect, an apparatus includes at least one processor programmed with instructions to receive physical information of a real world person viewing a virtual being in the metaverse, and based on the physical information of the real world person, dynamically alter the appearance of the virtual being in the metaverse.

In another aspect, a method, includes receiving at least one image of a real world person viewing a virtual person on a display, and customizing an appearance of the virtual person being presented on the display according to the image. In addition to the display being viewed by the real world person, the method can include customizing the appearance of the virtual person on at least one other display. Indeed, the method may include customizing the appearance of the virtual person on the display viewed by the real world person and on a number of additional displays, with the number being selected according to a status of the real world person.

The details of the present application, both as to its structure and operation, can be best understood in reference to the accompanying drawings, in which like reference numerals refer to like parts, and in which:

DETAILED DESCRIPTION

Figure 1:
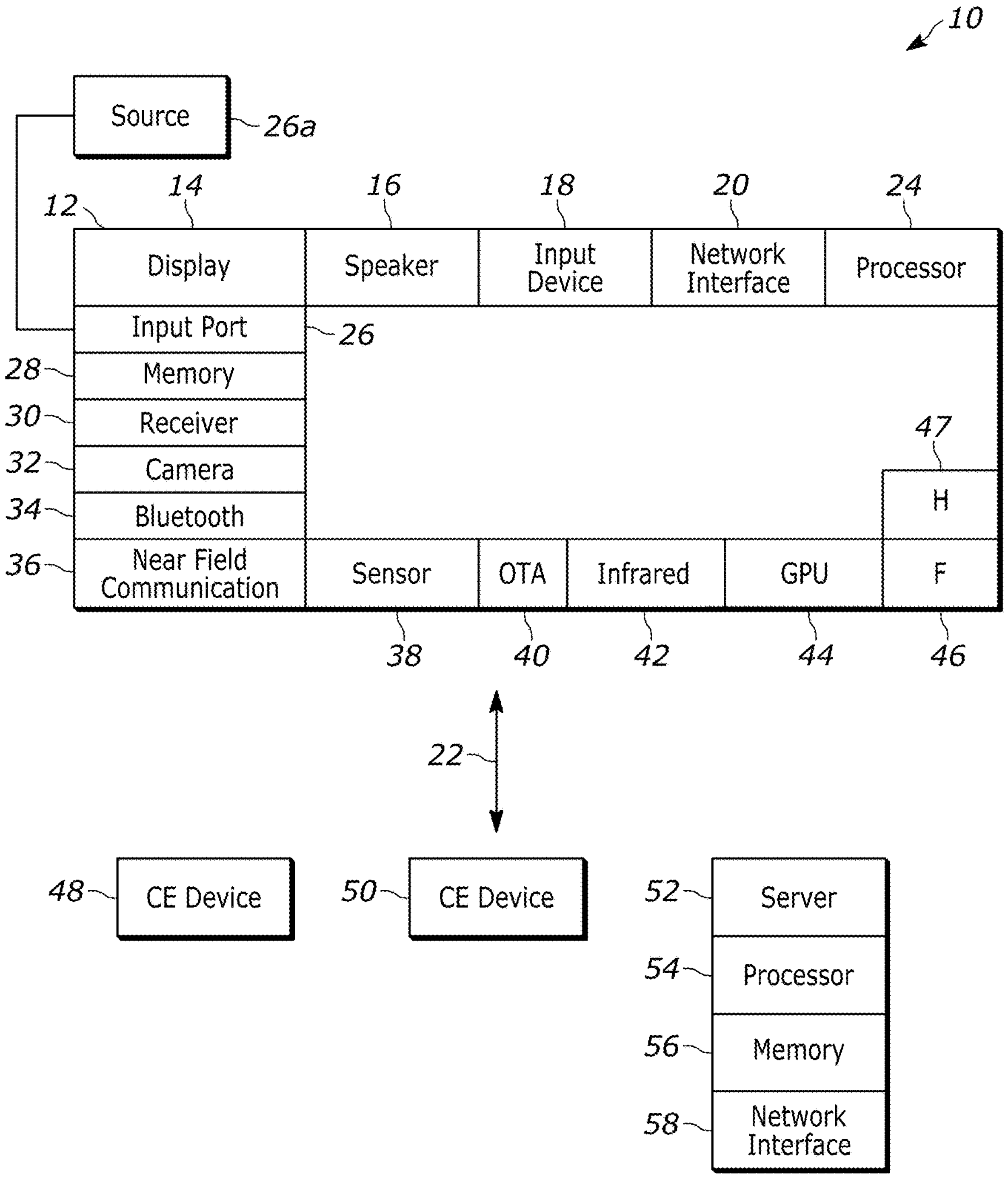
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
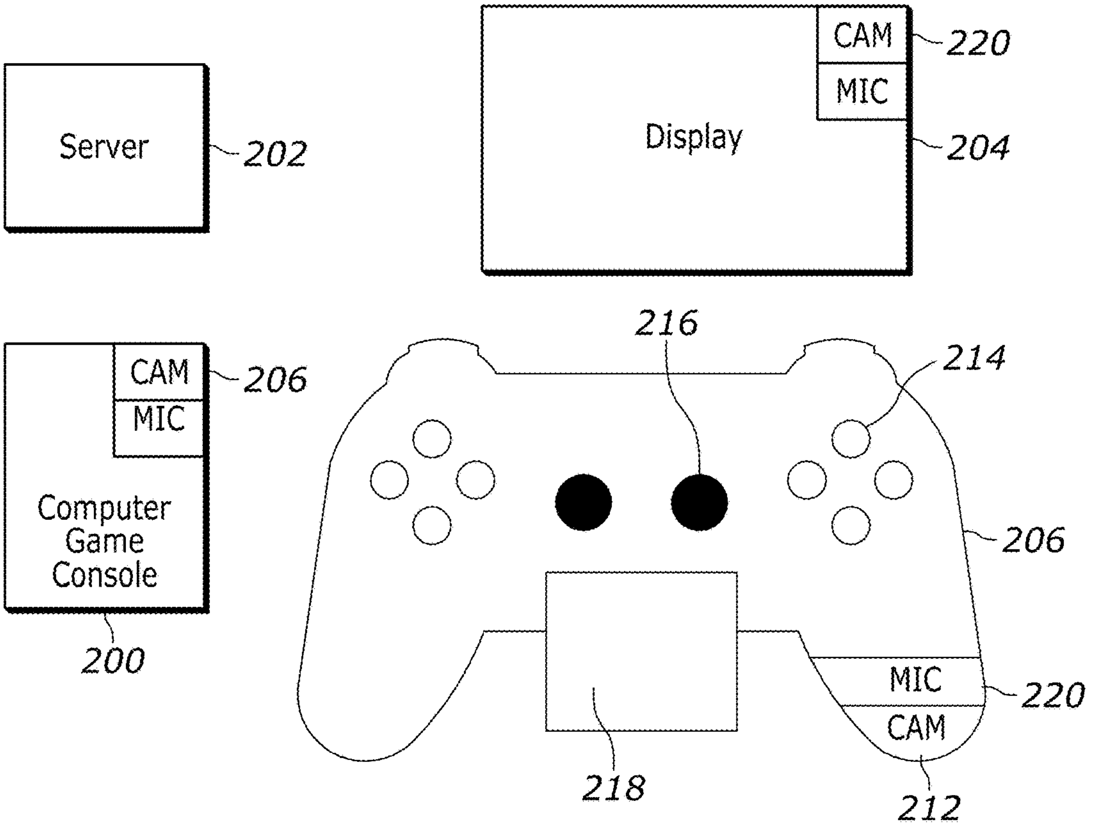
FIG. 2 is a block diagram of a specific computer simulation system such as a computer game system that can be used to present, in computer simulations, customized virtual humans and pets in the metaverse.

Refer now to FIG. 2. A computer simulation such as a computer game may be sent from a computer game console 200 or a computer game server 202 to a display device 204 such as a TV or AR or VR headset for presentation of the computer simulation under control of one or more computer simulation controllers 206, such as but not limited to a PlayStation® controller or other controller. The elements of the system incorporate some or all of the appropriate devices and components described above in reference to FIG. 1, and may be networked in the so-called metaverse using Internet connectivity.

The console 200 may include one or more cameras 208. Similarly, the display 204 may include one or more cameras 210. Yet again, the controller 206 may include one or more cameras 212.

The controller 206 may include one or more control keys 214 and one or more joystick-like control members 216. The controller 206 also may include one or more touchpads 218 and the controller and/or display and/or console may include one or more microphones 220.

Figure 3:
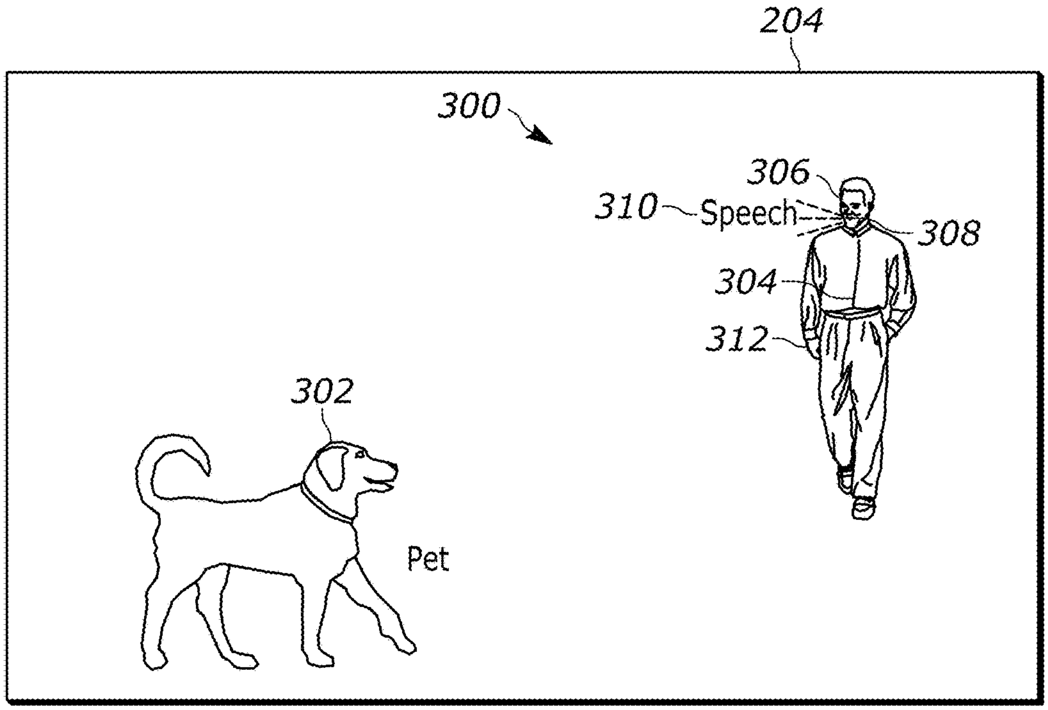
FIG. 3 illustrates an example screen shot of an example virtual human and virtual pet that may be presented on one or more screens such as AR or VR headsets networked together in the metaverse.

FIG. 3 illustrates a virtual human 300 that may be presented in, e.g., a metaverse application on the display 204, which may be implemented as a VR or AR HMD. One or more non-human characters 302 such as animals including pets also may be presented and may be customized according to principles herein, although FIG. 3 illustrates, for brevity, only the human character 300 being customized.

By "customized" is meant that the virtual human 300 appears on the display in an altered manner than as may have been received from an original game software. It is to be understood that the virtual human 300 may be customized only on the display 204 of a particular user, or it may be customized and then information regarding the customized appearance may be sent via the Internet or other network to the displays or game engines of other displays of users with whom the user associated with the display 204 is interacting, so that virtual human appears with the customized appearance on those displays. Moreover, in some cases, such as when the user associated with the display 204 is an influencer or master gamer, then information regarding the customized appearance may be sent via the Internet or other network to the displays or game engines of other displays not only of users with whom the user associated with the display 204 is interacting, but also to the displays of some or all users in the metaverse whose metaverse view encompasses the virtual location of the virtual human 300, so that virtual human appears with the customized appearance on those displays. Along with the information regarding the customized appearance of the virtual human 300, the virtual location of the virtual human in the metaverse also may be communicated to other display systems. In other words, the number of displays to which the user's customization is sent can depend on the status of the user, and that may be determined automatically b the system, which can automatically propagate the customization accordingly.

As shown in FIG. 3, the virtual human 300 may wear a costume 304 or other apparel customized according to principles herein. The skin tone or color 306 of the virtual human 300 may be customized according to principles herein as well as the emotion 308 (represented by a smile in FIG. 3) of the virtual human 300. Speech 310 of the virtual human 300 also may be customized to speak with a particular accent or language. Behavior 312 (represented in FIG. 3 by ebulliently raised arms) of the virtual human 300 also may be customized.

Figure 4:
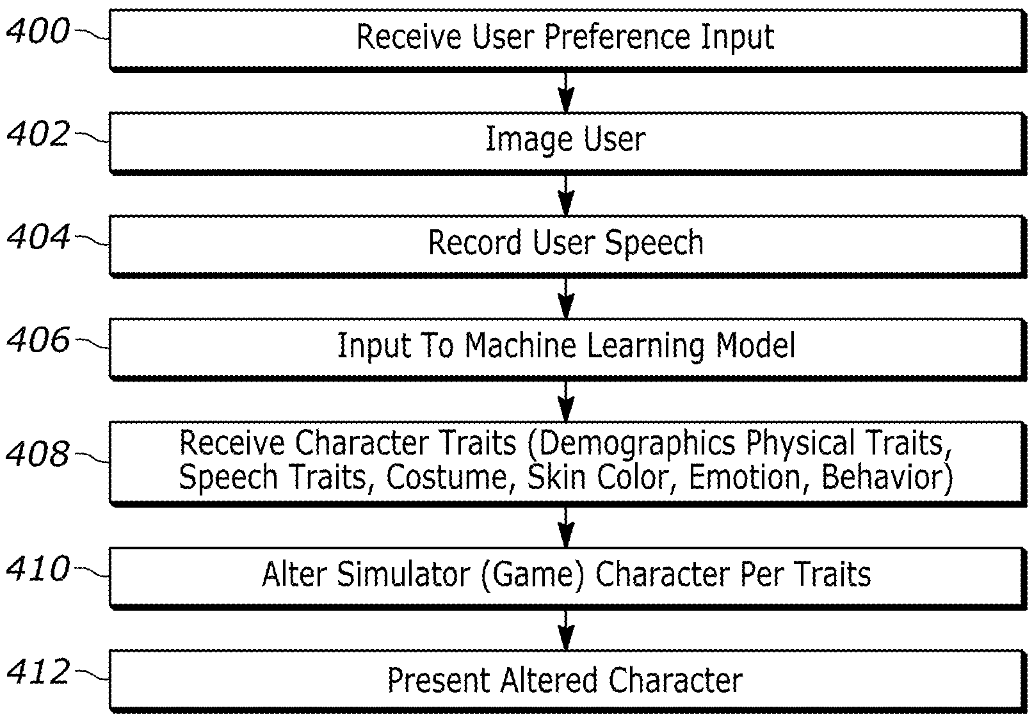
FIG. 4 illustrates example logic in example flow chart format consistent with FIG. 3.

Turn now to FIG. 4. Commencing at block 400, a user preference from an input device, e.g., the controller 206 in FIG. 2 or voice input, may be received indicating the user's desired customization of the virtual human 300 apart from additional techniques described herein.

Moving to block 402, the user of the display 204 may be imaged by any of the cameras described herein. The speech of the user may be recorded at block 404 by any of the microphones discussed herein. The image and/or speech may be input at block 406 to a ML model which in response to the input outs customizations for the virtual human 300 at block 408.

As indicated in block 408, the customizations may include such things as character traits including physical demographic traits corresponding to the user's demographics as detected by face recognition techniques or voice recognition techniques. Also, based on the user's appearance and/or speech, the ML model may output a customized costume or other apparel, customized skin color, emotion, and behavior of the virtual human 300.

Moving to block 410, the appearance and/or voice of the virtual human 300 is altered from the original appearance/voice of virtual human 300 from the original game according to the output of the ML model at block 410, as illustrated in FIG. 3. As mentioned above, this customization may be propagated along with the virtual location of the virtual human 300 across the metaverse, to all or select players in the metaverse for presentation at block 412 of the virtual human 300 on the display 204 of the user and other metaverse displays. This customization can occur offline or in real time/near real time as the user information is received.

Figure 5:
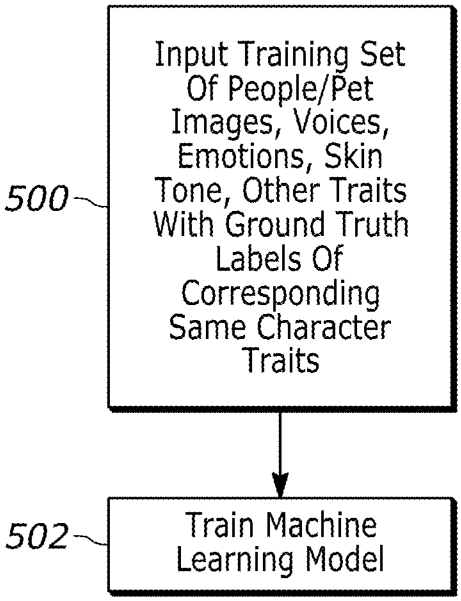
FIG. 5 illustrates example logic in example flow chart format for training a machine learning (ML) model to customize virtual humans and pets.

FIG. 5 illustrates how the ML model discussed in relation to FIG. 4 may be trained. At block 500 a training set of images (and if desired, in parallel, voices) of real world pets and humans along with labels indicating emotion, behavior, and other traits as desired is input to the ML model along with ground truth of what those traits are, including costumes/apparel, skin tone/color, accent, and language. The ML model is trained on the training set at block 502, and training may continue during use of the model as described in FIG. 4.

Figure 6:
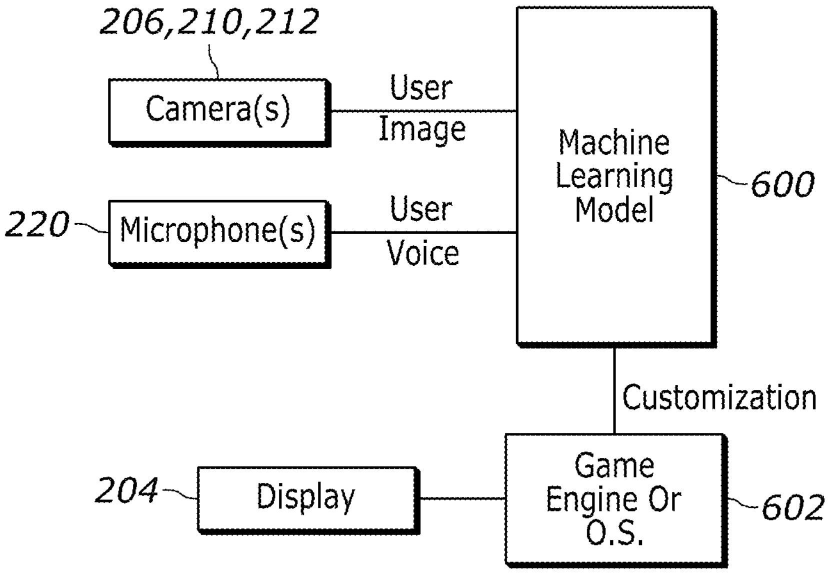
FIG. 6 illustrates an example architecture consistent with present principles.

FIG. 6 illustrates that one or more cameras such as any one or more of the cameras 206, 210, 212 in FIG. 2 may input images of the user to an ML model 600. Also, any one or more microphones such as any one or more of the microphones 220 shown in FIG. 2 may input signals representing the user's voice to the ML model. While a single ML model is shown, separate ML models may be used to analyze images and voice, respectively. Separate loss functions may be used for images and voice, respectively, whether one ML model is used or plural ML models are used.

The ML model 600 outputs customization information as described above to a game engine 602 generating images and voice of the virtual human 300 in FIG. 3 or alternatively to an operating system of the simulation system (such as the O.S. of the display 204) to apply the customization from the ML model 600 to the virtual human 300 for displaying the virtual human 300 on the display 204 (and other displays in the metaverse if desired) according to the customization. That is, the appearance and/or emotion and/or behavior of the virtual human 300 is altered from that as originally sourced in an original game to conform to the customization from the ML model 600.

While the particular embodiments are herein shown and described in detail, it is to be understood that the subject matter which is encompassed by the present invention is limited only by the claims.

What is claimed is:

1. A device comprising:

at least one computer storage that is not a transitory signal and that comprises instructions executable by at least one processor to:

execute A, or B, or both A and B, wherein A comprises:

receive at least one image of a person;

input the image to a machine learning (ML) model;

receive from the ML model first information regarding customization of a virtual being in a metaverse; and present on a display the virtual being with a customized appearance altered from an original appearance from original game software according to the first information from the ML model; and wherein B comprises:

receive at least one recording of speech of the person;

input the recording to the ML model;

responsive to inputting the recording to the ML model, receive from the ML model second information regarding customization of the virtual being; and present the virtual being with a customized voice altered from an original voice from the original game software according to the second information from the ML model; and send the first information regarding customization to at least one display presenting a metaverse other than the display so that the virtual being appears in customized form on the at least one display presenting the metaverse, the first information regarding customization being sent to the at least one display presenting the metaverse based on a status of the person.

2. The device of claim 1, wherein the virtual being is a virtual human.

3. The device of claim 1, wherein the virtual being is a virtual non-human animal.

4. The device of claim 1, wherein the instructions are executable to execute A.

5. The device of claim 1, wherein the instructions are executable to execute B.

6. The device of claim 1, wherein the instructions are executable to execute A and B.

7. The device of claim 1, comprising the processor.

8. The device of claim 1, wherein the status of the person includes being one or more of: an influencer, a game master.

9. The device of claim 1, wherein the instructions are executable to:

present on the display the virtual being with the customized appearance at least in part by providing the information regarding customization to a game engine of the original game software.

10. An apparatus comprising:

at least one processor programmed with executable instructions to:

customize an appearance of a virtual being presented on a display according to at least one image of a person to render an altered appearance of the virtual being, the altered appearance based at least in part on an original appearance from original game software;

access at least one recording of speech of the person;

input the recording to a machine learning (ML) model;

responsive to inputting the recording to the ML model, receive, from the ML model, information regarding customization of the virtual being; and present the virtual being with a customized voice altered from an original voice from the original game software according to the information from the ML model.

11. The apparatus of claim 10, wherein the virtual being comprises a virtual human.

12. The apparatus of claim 10, wherein the virtual being comprises a non-human virtual animal.

13. The apparatus of claim 10, wherein the instructions are executable to:

send the altered appearance to at least one display presenting a metaverse including the virtual being other than the display so that the virtual being appears in customized form on the at least one display presenting the metaverse, the altered appearance being sent to the at least one display presenting the metaverse based on a status of the person.

14. The apparatus of claim 10, wherein the at least one processor is programmed with instructions to:

provide the altered appearance to a game engine of the original game software.

15. A method, comprising:

receiving at least one image of a real world person viewing a virtual person on a display;

customizing an appearance of the virtual person being presented on the display according to the at least one image to render an altered appearance of the virtual person, the altered appearance being determined at least in part from an original appearance from original game software; and sending first information regarding customization to at least one display presenting a metaverse other than the display so that a virtual being appears in customized form on the at least one display presenting the metaverse, the first information regarding customization being sent to the at least one display presenting the metaverse based on a status of the real world person.

16. The method of claim 15, comprising:

accessing at least one image of a person;

inputting the image to a machine learning (ML) model;

receiving, from the ML model, first information regarding customization of the virtual being in the metaverse;

presenting, on a display, the virtual being with a customized appearance altered from an original appearance from original game software according to the first information from the ML model.

17. The method of claim 15, comprising:

accessing at least one recording of speech of the person;

inputting the recording to a machine learning (ML) model;

responsive to inputting the recording to the ML model, receiving, from the ML model, second information regarding customization of the virtual being; and presenting the virtual being with a customized voice altered from an original voice from the original game software according to the second information from the ML model.

18. The method of claim 16, comprising:

providing the first information regarding customization to a game engine of the original game software to present on the display the altered appearance.

19. The method of claim 15, wherein the status of the person includes being one or more of: an influencer, a game master.

* * * * *